Figure 1:
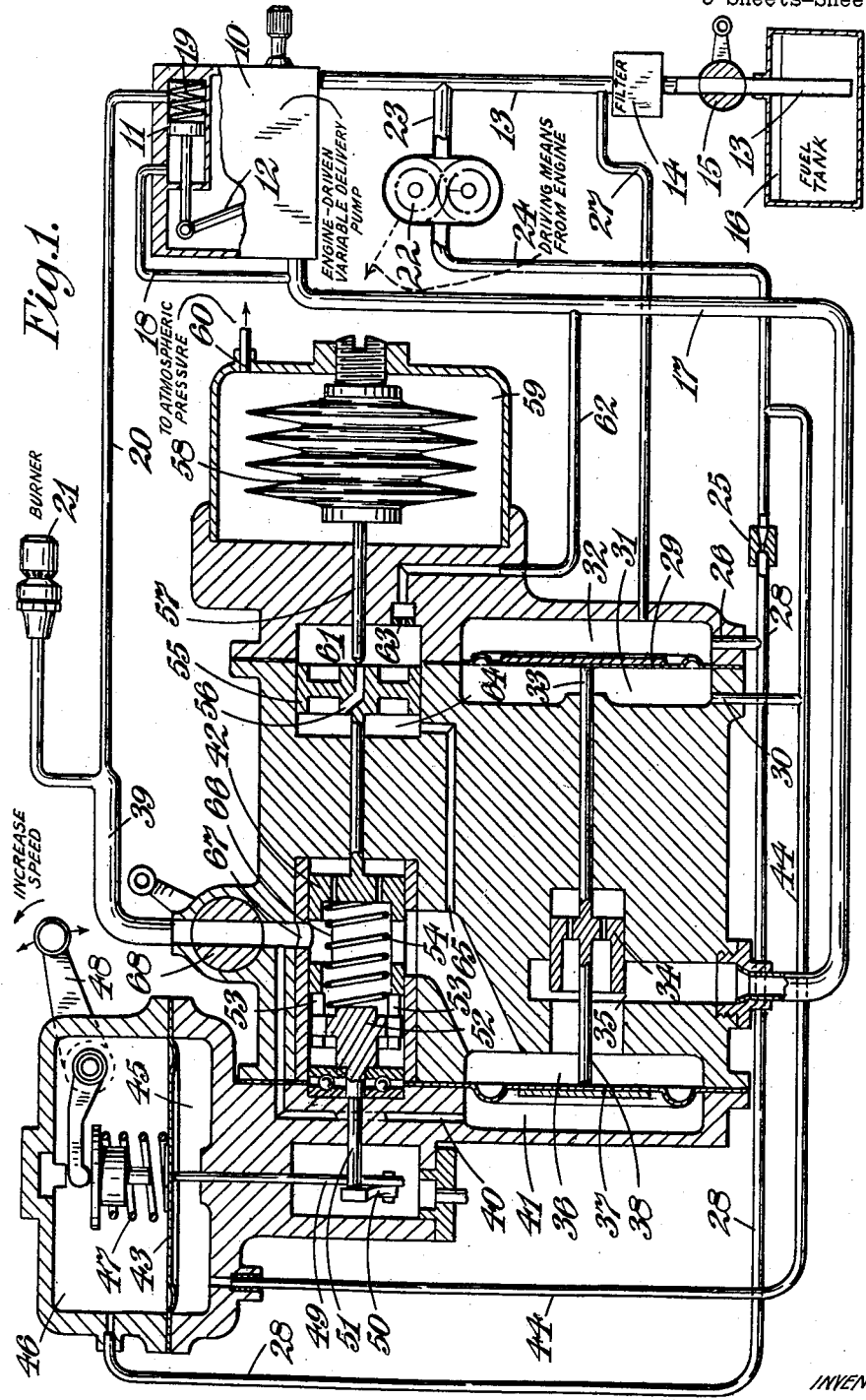

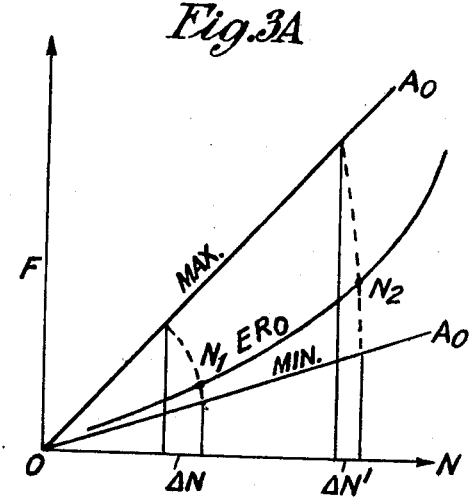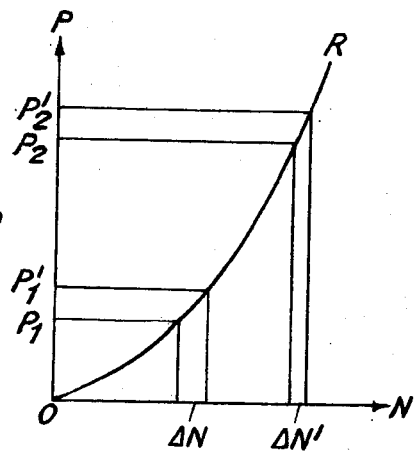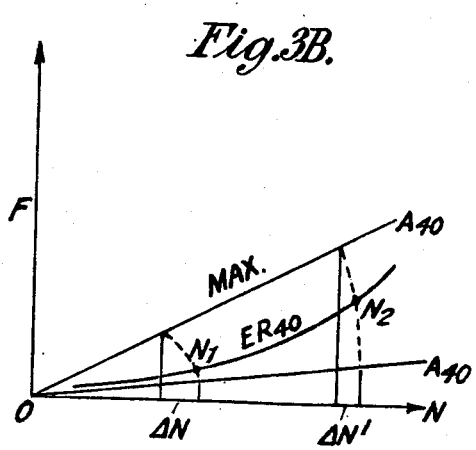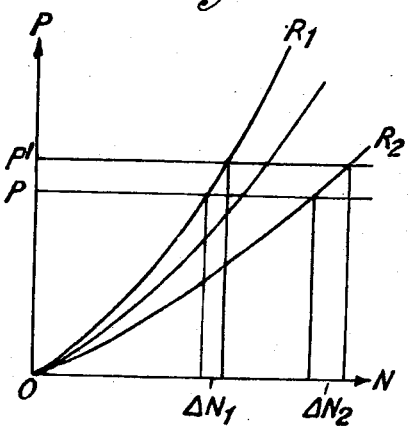

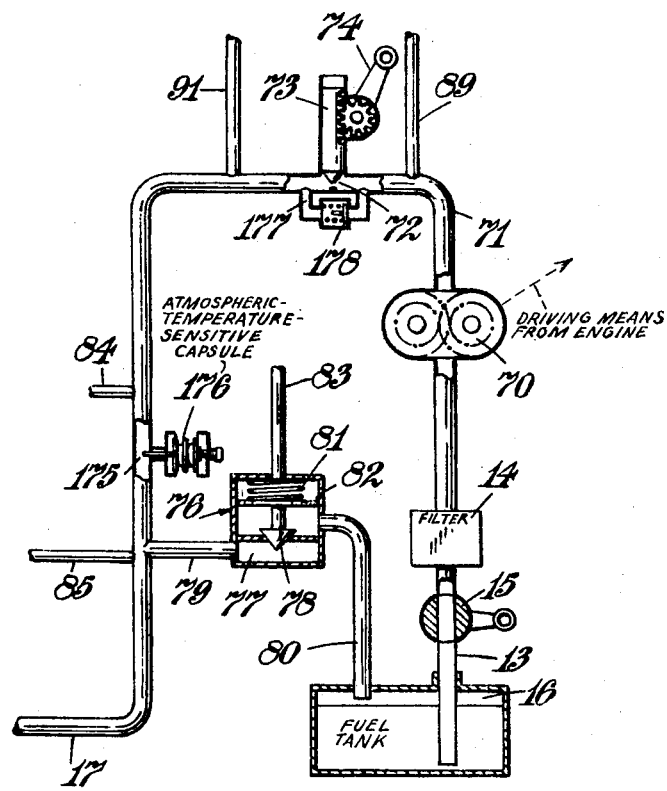

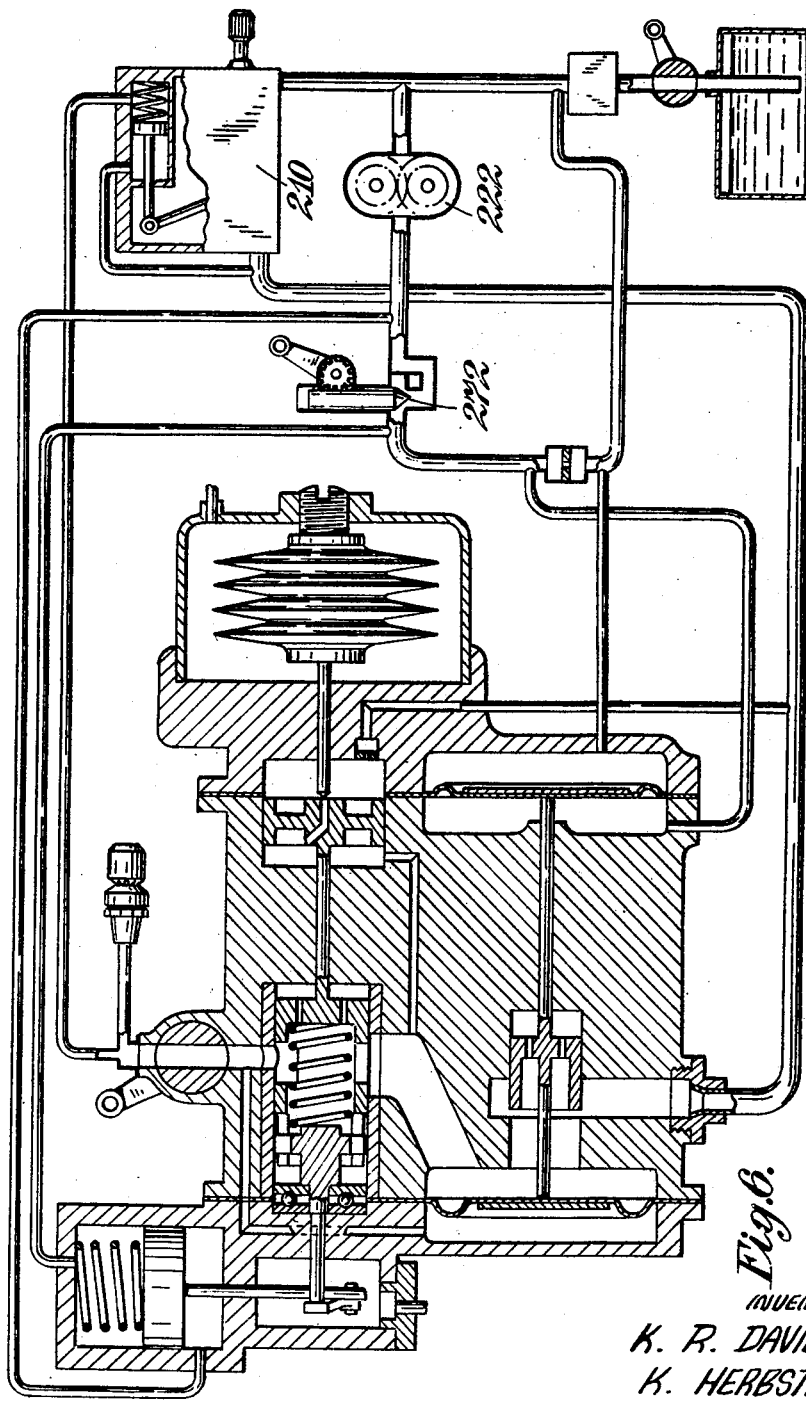

Patented Apr. 13, 1954

2,674,847

UNITED STATES PATENT OFFICE 2,674,847

CONTROL MEANS IN FUEL SYSTEM OF GAS-TURBINE ENGINES

Kenneth Roy Davies, Ockbrook, and Karl Herbstritt, Chellaston, England, assignors to Rolls-Royce Limited, Derby, England, a British company Application April 15, 1949, Serial No. 87,696

Claims priority, application Great Britain April 22, 1948

32 Claims. (Cl. 60—39.28)

This invention relates to fuel systems for gas-turbine engines which include a mechanism hereinafter referred to as "hydraulic governor means" comprising a pressure-responsive device for effecting a variation in the fuel delivery to the engine by its response to pressure changes and arranged to be responsive to the pressure drop across restricting means through which a fluid is caused to flow by a fixed volumetric capacity pump driven at a speed proportional to the engine rotational speed.

In the fuel system of a gas-turbine engine it is desirable to prevent excessive supply of fuel during acceleration and to ensure adequate supply of fuel during deceleration, since over-fueling and under-fueling may cause the flame in the combustion equipment to be extinguished.

In the fuel-system of a gas-turbine engine used for aircraft propulsion, it is desirable to ensure that the fuel supply is appropriately modified for changes in altitude of flight. With increase of altitude, the amount of air passing to the combustion equipment decreases and the fuel supply should be accordingly decreased.

It is the object of this invention to provide a fuel system for a gas-turbine engine which will meet one or more of these desiderata.

According to the present invention a fuel system for a gas-turbine engine comprises a fuel pump for delivering fuel to the engine and control means for controlling the flow from the fuel pump to the engine comprising a first hydraulic governor means operative to define for each instantaneous rotational speed of the engine in acceleration a preselected maximum fuel supply to the engine, which maximum fuel supply is in excess of the engine requirements for steady running at each such speed, and a second hydraulic governor means having a datum which is variable to preselect a desired steady running rotational speed, which second hydraulic governor means is operative to control the fuel supply to the engine to determine and maintain such desired speed.

According to another aspect of this invention, a fuel system for a gas-turbine engine may comprise a fuel pump to deliver fuel to the engine and means to control the flow of fuel from the pump to the engine comprising two hydraulic governor means, one of which hydraulic governor means is arranged to adjust the pressure drop across a valve operated by the second hydraulic governor means to be dependent on the rotational speed of the engine and said second hydraulic governor means which has a variable datum for the preselection of a desired steady running rotational speed and which is arranged to meter the fuel supply to the engine through the valve operated by it to determine and maintain the preselected rotational speed.

According to yet another aspect of this invention, a fuel system for a gas-turbine engine may comprise a fuel supply pump, fuel injection means supplied with fuel by the pump, at least two valve-restricting means located in series between the fuel supply pump and the fuel-injection means, a first hydraulic governor having its pressure-responsive means loaded at least by the pressure existing between the two valve-restricting means and preferably by the pressure drop across the second valve-restricting means and a second hydraulic governor means arranged to control the second of said valve-restricting means, said second hydraulic governor means having a datum which can be varied to preselect an engine rotational speed, whereby said hydraulic governor means operates to control the fuel supply to the fuel-injection means in such a manner as to determine and maintain the preselected engine rotational speed.

According to yet another aspect of this invention, a fuel system for a gas-turbine engine may comprise a fuel pump arranged to deliver fuel to the engine and means to control the flow of fuel from the pump to the engine comprising a first hydraulic governor means whereof the pressure-responsive device is arranged to operate valve means controlling the flow of fuel from the pump into a chamber, valve means controlling the outflow of fuel from said chamber to the engine and a second hydraulic governor means operative to control said second valve means, said first hydraulic governor means being arranged so to control said first valve means that the pressure drop across the second valve means is proportional to the square of the engine rotational speed, and a control device operatively connected with said second hydraulic governor means to preselect an engine rotational speed, said governors operating to control the fuel supply to the engine in such a manner as to determine and maintain the engine speed preselected by said control device.

The control device associated with the second hydraulic governor means to preselect an engine rotational speed may comprise a device for varying a resilient loading against which the pressure drop across the restricting means of this governor operates; alternatively the selection of an engine rotational speed may be effected by variation of the degree of restriction of the restricting means associated with the second hydraulic governor. In certain cases, the feature of variable resilient loading may be combined with that of a variable restricting means.

In accordance with a further feature of the invention the fuel flow to fuel injection means associated with the engine is additionally controlled by a valve operated by pressure sensitive means subjected to a pressure determined by one of the operating variables of the engine. Preferably in the application of the invention to aircraft gas-turbine engines, this pressure sensitive means is subjected to ambient or intake air pressure, whereby fuel supply to the engine is varied in accordance with altitude. In one form of the invention the valve means operated by the second hydraulic governor is additionally controlled by a pressure sensitive device, for example it may be provided with two senses of movement, movement in one sense being under the control of a pressure sensitive device and movement in the other sense being under the control of the second hydraulic governor.

Fuel systems in accordance with the invention provide, by the operation of the first hydraulic governor means, for the limitation of the maximum possible fuel supply to the engine in accordance with the instantaneous running rotational speed thereof; by the operation of the second hydraulic governor means, for the modification of the fuel supply from such maximum value to that required for a preselected engine rotational speed, and by the operation of the altitude pressure sensitive device, when one is incorporated in the system, for reduction of such maximum fuel supply with increase of altitude.

In one embodiment of the invention the fuel system comprises a fuel pump of the kind in which the volumetric capacity can be varied, and, in addition thereto, a pump of fixed volumetric capacity, driven at a speed proportional to the engine rotational speed, which supplies a flow of hydraulic fluid through a restricting means associated with the two hydraulic governor means.

In another embodiment of the invention the pump supplying fuel to the engine is of the fixed volumetric capacity kind and is driven at a speed proportional to engine rotational speed, and this pump, in addition to supplying the engine, delivers through restricting means associated with the hydraulic governor means, the flow being proportional to the engine rotational speed.

Some embodiments of the invention are diagrammatically illustrated in the accompanying drawings in which—

Figure 2:
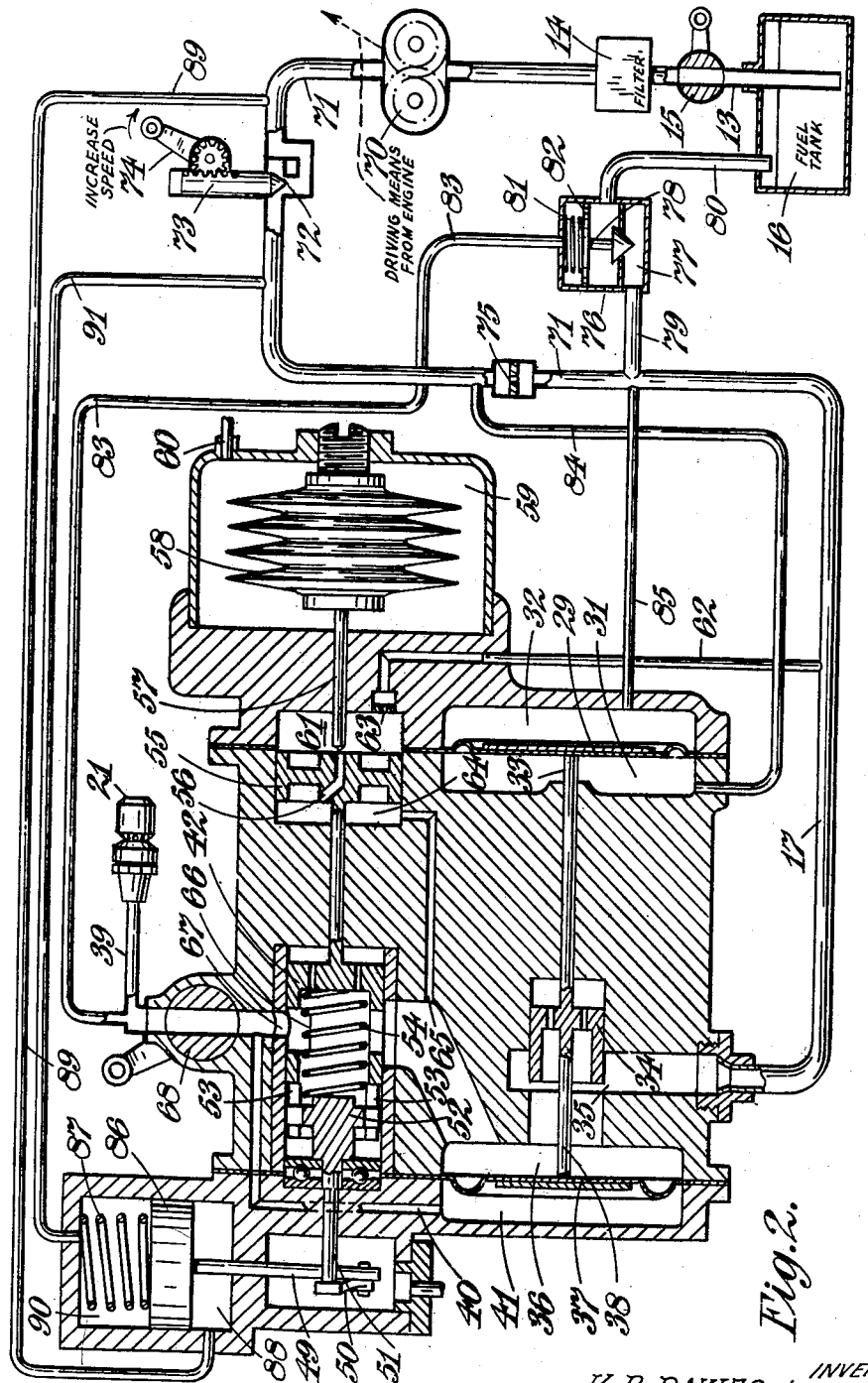

Figure 1 illustrates a fuel system in which a pump separate from the main fuel pump is provided for supplying pressure fluid to the hydraulic governors and the main fuel pump is of the variable delivery type, Figure 2 illustrates a modification of the fuel system illustrated in Figure 1, in which the main fuel pump also supplies pressure fluid to the hydraulic governors, Figures 3A, 3B, 4A, 4B illustrate graphically the functioning of the hydraulic controls of the control systems illustrated in Figures 1 and 2, Figure 5 illustrates a modification of the arrangement shown in Figure 2, and Figure 6 illustrates another modification of the fuel system illustrated in Figure 1.

Referring to Figure 1 the fuel system comprises a main fuel pump 10, e. g. of the reciprocating multi-plunger kind, the volumetric capacity of which can be varied by means of a piston 11 operating through lever 12. Fuel enters the pump 10 through suction pipe 13, which includes a low pressure filter 14 and manually operated low pressure shut-off cock 15. A fuel supply tank is diagrammatically indicated at 16. The fuel pump pressure delivery pipe is shown at 17, from which pipe a pipeline 18 provides a connection with the cylinder, in which the piston 11 operates, to load the latter in the sense of reduction of stroke of the pump. The piston is loaded in the opposite sense by a spring 19 and also by hydraulic pressure supplied in the manner described in further detail below through a pipe 20 leading from the pipeline 39 supplying the engine fuel injectors. One of the latter is illustrated at 21.

In addition to the variable delivery fuel pump mentioned above there is a further pump 22 of the gear type, which is driven by the engine at a rotational speed proportional to that of the engine. This pump, which is of substantially constant volumetric capacity, draws in fuel from the supply pipe 13 through a branch pipe line 23, and delivers into pipeline 24. The flow through the pump is thus substantially directly proportional to the engine rotational speed. This flow is used in the hydraulic governing systems and passes through a fixed metering orifice 25 and thence by branch pipeline 26, chamber 32 and return pipe 27 back to the fuel inlet pipe 13.

It will be appreciated that since the delivery flow from the pump 22 is substantially proportional to the engine rotational speed and the metering orifice 25 is fixed in size, a pressure drop occurs across this orifice as between pipeline 24 and pipeline 28, from which the pipeline 26 branches, which pressure drop is proportional approximately to the square of the engine rotational speed. This pressure drop is applied to diaphragm 29, the pressure upstream of the orifice being introduced by a branch pipeline 30 from pipeline 24 into chamber 31 and the pressure downstream of the orifice being introduced by branch pipeline 26 into chamber 32 as above described. The diaphragm 29 is connected to a rod 33 carrying a slide valve 34, arranged to cooperate with a valve port 35 at the delivery end of the pressure-fuel supply pipe 17. The slide valve 34 thus controls the flow from the supply pipe 17 into an intermediate pressure chamber 36. The pressure in this chamber operates on a further diaphragm 37 connected through rod 38 with the slide valve 34, the diaphragm 37 being additionally loaded by the pressure existing in the pipeline 39, which pipeline supplies the fuel to fuel injecting means such as nozzle 21 in the engine. The pressure is transmitted through passageway 40 to chamber 41 of which the diaphragm 37 constitutes a wall.

It will be appreciated that the slide valve 34 is controlled as to position by the balance of the loads on the diaphragms 29 and 37. The load on the diaphragm 29 is proportional approximately to the square of the engine rotational speed, and the load on the diaphragm 37 is proportional to the pressure drop existing between the intermediate chamber 36 and the fuel supply pipeline 39 to the fuel injectors 21.

A second hydraulic governing mechanism is provided for controlling a further slide valve indicated at 42 between the intermediate chamber 36 and pipeline 39. This valve can be moved in two senses and is arranged to be rotated by a hydraulic governor device and to be displaced axially under control of an altitude sensitive device. The governor device comprises a diaphragm 43 which is subjected to the pressure drop across the metering orifice 25, the pressure upstream of the orifice being communicated to chamber 45 through pipeline 44 (branching from pipeline 30) while pressure downstream of the orifice is communicated to chamber 46 by pipeline 28. The diaphragm is additionally loaded by means of a spring 47, the spring load being varied by a power control lever 48. Movement of the diaphragm is transmitted to the slide valve 42 through a rod 49 connected to the diaphragm and arranged to rock a lever 50 to rotate a shaft 51, which shaft 51 carries a cross head 52 engaging in axial slots 53 formed in the slide valve 42. Thus movements of the diaphragm 43 cause a corresponding rotational movement of the slide valve 42. The engagement of the cross head 52 in slots 53, however, leaves the slide valve 42 free for axial movement. A compression spring 54 urges the valve in the axial sense of movement to the right, whilst movement to the left is effected by a servo-mechanism with operating pressure arising from the pressure drop across the port 35 operating on a piston 55. This piston is formed with a passageway 56, flow through which is controlled by means of a plunger rod 57 connected to an evacuated capsule 58 accommodated in a chamber 59, which chamber is subjected to ambient atmospheric pressure through pipe connection 60. The capsule is of the kind which expands axially as a result of reduction of external pressure to which it is subjected. The supply of pressure liquid for operation of the servo-mechanism is led to cylinder space 61 through pipeline 62 and restricted orifice 63, while the cylinder space 64 on the other side of piston 55 communicates with intermediate chamber 36 through passageway 65.

The operation of the servo-mechanism on expansion or contraction of the capsule 58 resulting from a change of atmospheric pressure is as follows: The area of the restricted orifice 63 is selected in relation to the effective area of the passageway 56 as controlled by the plunger rod 57 to maintain balance of hydraulic loads on the piston 55. Thus, when the capsule 58 expands, the rod 57 closes the passageway 56 and servo pressure is built up in the cylinder space 61 causing the piston 55 to move to the left and to adjust the position of the slide valve 42 against spring 54 until a balanced position is reached. Contraction of the capsule 58 opens the passageway 56 equalizing pressures on both sides of the piston 55, so that the slide valve 42 then moves under the load of the spring 54 to follow up the movement of the rod 57.

The fuel system also includes a high pressure shut-offcock 68 which is incorporated in the fuel supply pipeline 39 and is used in starting and shutting down the engine.

Turning now to the functioning of the additional slide valve 42, this valve is incorporated to modify the pressure in the intermediate chamber 36 appropriate for the running conditions of the engine as selected by the positioning of the lever 48, and also to maintain selected running conditions independently of altitude variation. The slide valve is therefore formed with a port 66 of rectangular form co-operating with the port area 67 at the inlet to the pipeline 39 supplying fuel to the fuel injection means. The arrangement is such that axial movement of the valve to the left results in closure of the port 67, whilst rotational movement of the valve arising from upward movement of the diaphragm also causes closure of the port.

Considering the functioning of the two hydraulic governors and neglecting the effect of the altitude capsule 58, it will be observed that the valve 42 will modify the pressure in the intermediate chamber 36 by introducing an additional restriction in the flow to the pipeline 39, such restriction being increased when the hydraulic governor comprising the diaphragm 43 senses an engine speed in excess of the speed selected by the setting of the lever 48, i. e. when the pressure drop between chambers 45 and 46 exerts a load overcoming the spring loading 47. Alternatively if the hydraulic governor senses a speed which is less than the speed selected by the setting of the lever 48, i. e. when the load exerted by the pressure drop between chambers 45 and 46 is overcome by the spring 47 the valve 42 will open, reducing the restriction of fuel flow between chamber 36 and supply pipeline 39. The pressure difference between the supply pipeline 39 and chamber 36 is however maintained to be substantially proportional to the square of the engine rotational speed, this pressure difference being determined by balance of the diaphragm hydraulic loading on the diaphragms 29 and 37.

When the lever 48 is moved anti-clockwise to accelerate the engine, the spring 47 is compressed and the valve 42 is rotated to open the port 67. The maximum amount of fuel which can possibly pass to the injectors 21 when the port 67 is fully open is then dependent on the area of the port and on the pressure difference across it. This pressure difference is maintained substantially proportional to the square of the engine rotational speed, so that the maximum amount of fuel which can possibly pass to the injectors is proportional to the engine speed.

When the lever 48 is moved to slow down the engine, the valve 42 is rotated so as to reduce the area of the port 67. However, the valve 42 is not able to close the port 67 completely but leaves a fixed area unclosed at all times. The minimum amount of fuel which can flow to the engine is determined by this fixed area and the pressure drop across it. As explained above, the pressure drop is maintained proportional to the square of the engine speed, and, since the area will be fixed in size for all speeds, the minimum obtainable fuel flow at all speeds is also proportional to the engine speed.

The extent to which the valve 42 can be rotated to open or to close the port 67 may be limited by stops which can be adjustable so that the maximum or minimum flow obtainable at any speed may be adjusted.

These features are of considerable advantage since it is desirable to limit the maximum and minimum possible fuel flow to a gas-turbine engine in accordance with the rotational speed of the engine, in order to ensure that flame in the combustion equipment is not extinguished by too great and sudden a change in the amount of fuel supplied.

The functioning of the altitude capsule 58 can be appreciated from consideration of the movement of the valve 42 under control of the capsule independently of rotational movement of the valve by the hydraulic governor. In effect the plunger rod 57 of capsule 58 introduces an additional restriction between the intermediate chamber 36 and fuel supply pipeline 39, which restriction is a function of the altitude pressure, and increases with increase of altitude. The maximum possible flow to the pipeline 39, i. e. considering the valve to be fully open insofar as it is moved by the hydraulic governor diaphragm 43 is thus reduced with increase of altitude. This feature is of considerable advantage in the fuel system of an aircraft gas-turbine engine, where the fuel flow must be varied in accordance with altitude to maintain a particular engine rotational speed.

In Figure 2 there is illustrated a modification of the fuel system described with reference to Figure 1, in which the fuel pump is of the fixed volumetric kind (as opposed to the variable delivery pump shown in Figure 1) and in which a modified form of variable datum hydraulic governor is illustrated. Insofar as the system of Figure 2 is similar to that illustrated in Figure 1 like reference numerals are used. Thus the system includes the first hydraulic governor with diaphragm 29 and balancing diaphragm 37, slide valve 34, and a second valve element 42 arranged to be rotated by a second hydraulic governor and to be displaced axially by altitude responsive capsule 58 through servo piston 55. Likewise the fuel delivery line to the engine fuel nozzles 21 is indicated at 39 with shut-off-cock 68, the fuel pressure inlet pipe to the system being indicated at 17 communicating with the port 35.

In the system illustrated in Figure 2 the fuel pump 70, of the fixed volumetric kind, e. g. a gear pump, is driven by the engine at a speed proportional to the rotational speed thereof. This pump draws fuel from a tank diagrammatically illustrated at 16 through suction pipe 13, low-pressure fuel cock 15 and low-pressure filter 14. The rate of flow of fuel delivered by the pump 70 through pipeline 71 is thus approximately directly proportional to the engine rotational speed, and this flow passes through a variable orifice 72, the size of which can be altered by movement of a plunger element 73 resulting from adjustment of a power control lever 74. The full delivery flow of the pump 70 also passes through a fixed area restricting orifice 75 (equivalent to the fixed orifice 25 in Figure 1). Downstream of the orifice 75 the pipeline 71 connects with pipeline 17 communicating with the inlet port 35 controlled by the slide-valve 34. Fuel, delivered by the pump 70 through pipeline 71 in excess of the flow through pipeline 17 to the fuel nozzle 21, is bypassed through a relief valve 76, the excess fuel entering the valve chamber 77 below a valve element 78 through pipeline 79 and leaving the valve through outlet pipe 80 to be returned to the tank 16. The valve element 78 is loaded by compression spring 81 and also by hydraulic pressure acting on piston 82. The hydraulic pressure is applied through pipeline 83 connecting with the fuel supply pipeline 39. The pipeline 83 is equivalent to pipeline 20 in Figure 1 and the pressure therein serves to regulate the pressure in pipeline 17 in a manner such that the latter pressure exceeds the fuel nozzle delivery pressure by a substantially predetermined amount, so that the pressure drop through the system is sufficient for the operation of the governors but is not excessive, particularly under altitude and slow running conditions.

It will be appreciated that since the flow through the orifice 75 is substantially directly proportional to the engine rotational speed a pressure drop arises across said orifice which is approximately proportional to the square of the engine rotational speed. The pressure upstream of the orifice 75 is transmitted to the chamber 31 through pipeline 84 (equivalent to pipeline 30, Figure 1), and the pressure downstream of the orifice of 75 is transmitted to chamber 32 through pipeline 85 (equivalent to pipe 26, Figure 1). The diaphragm 37 (as in Figure 1) is hydraulically loaded by the pressure in the intermediate chamber 36 and, by connection through passage-way 40, by the pressure in pipeline 39, whereby the valve 34 is operated in a manner similar to that described with reference to Figure 1.

In addition the variable orifice 72 passes the full fuel delivery flow from the pump 70, and thus for any one selected position of the valve element 73 by the lever control 74, the pressure drop across this orifice 72 is approximately proportional to the square of the engine rotational speed. This pressure drop is applied to a piston and cylinder device, of which the piston 86 is the equivalent of the diaphragm 43 in Figure 1. The piston is loaded by a compression spring 87. The pressure upstream of the orifice 72 is transmitted to the cylinder space 88 through pipeline 89, and the pressure downstream of the orifice 72 is transmitted to a cylinder space 90 through pipeline 91. The hydraulic governor thus constituted is connected to the valve 42 to rotate it in a manner similar to that described in relation to Figure 1, although the replacement of the variable datum spring loading 47 in Figure 1 by the variable orifice 72 produces a differing governor characteristic as will be described below.

The functioning of the two systems described with reference to Figures 1 and 2 may be more readily appreciated by reference to Figures 3A, 3B, 4A and 4B.

Referring to Figures 3A and 3B, these illustrate curves plotting fuel flow (F) against engine rotational speed (N); Figure 3A indicates the curves for a low altitude condition, utilising the suffix 0, and Figure 3B illustrates curves for a high-altitude condition utilising the suffix 40, equivalent for example to the condition at 40,000 ft. altitude.

In Figure 3A straight lines $OA_0$ (max.) and $OA_0$ (min.) show respectively the maximum and minimum flow lines as defined by the first hydraulic governor operated valve 34 and the maximum and minimum possible areas of the port 67 (the adjustable stops, if provided, being in a fixed position) when the valve 42 is set by the altitude capsule 58 for the low altitude condition. The fuel line $OA_0$ (max.) indicates the flow when the valve 42 is fully open, insofar as it is moved by the second hydraulic governor, and the fuel line $OA_0$ (min.) indicates the flow when the valve 42 is fully closed insofar as it is moved by the second hydraulic governor. The engine requirement fuel line is indicated by the curve $ER_0$, and lies between $OA_0$ (max.) and $OA_0$ (min.).

In Figure 3B corresponding flow lines $OA_{40}$ (max.), $OA_{40}$ (min.) are shown, defined by the setting of the valve 42 by the pressure capsule 58 subjected to high-altitude pressure e. g. at 40,000 ft. The engine requirement line is indicated at $ER_{40}$.

Figures 4A and 4B illustrate diagrammatically the differing functions of the second hydraulic variable datum governor as illustrated in Figure 1, where the datum is varied by variation of the load on the spring 47, and in Figure 2, where the variation of datum is effected by variation of the orifice size 72, respectively. In Figures 4A and 4B, the load P operating on the diaphragm 43 or the equivalent piston 86 (Figures 1 and 2 respectively) is plotted against engine rotational speed N.

In Figure 4A, since the pressure drop across the fixed orifice 25 is proportional to the square of the engine speed N and the load on the diaphragm 43 is proportional to the pressure drop, there is a single curve relating the consequent load P on the diaphragm 43 with engine rotational speed N. This curve is represented by the line OR. $OP_1$ and $OP_2$ are a measure respectively of two loadings on the spring 47 preselected by the control lever 48. Thus for the preselected load $OP_1$, when the load arising from the pressure drop across the orifice 25 equals $OP_1$, the valve 42 will begin to close and will reach its closed position when the load equals $OP'_1$. Likewise, for the preselected loading $OP_2$ the valve 42 will begin to close when the load arising from the pressure drop equals $OP_2$ and the valve will be closed when the load equals $OP'_2$. Assuming that the spring 47 has a constant rate, then $P_1P'_1$ is equal to $P_2P'_2$. The corresponding ranges of engine rotational speed over which this movement can be represented to take place are indicated by $\Delta N$, $\Delta N'$. This range of movement is referred to as the "run-up" and referring to Figure 4A it will be seen that for the lower engine rotational speed the run up is greater than that at the higher speed.

Referring now to Figure 4B, curves $OR_1$ and $OR_2$ illustrate the load arising on piston 86 due to the pressure drop across the variable orifice 72 (Figure 2) for two settings thereof. An intermediate setting is shown by an intermediate unreferenced curve. OP represents the loading of spring 87, corresponding to full open condition of the valve 42 insofar as the hydraulic governor actuates this valve, and OP' indicates the load exerted by the spring 87 when the valve 42 is fully closed in its actuation by the hydraulic governor. The corresponding "run-up" is indicated by $\Delta N_1$ and $\Delta N_2$ for the two orifice settings $OR_1$ and $OR_2$. Thus for the lesser engine rotational speed selected by orifice curve $OR_1$ the run-up is less than that for the greater engine rotational speed selected by the orifice curve $OR_2$.

The choice of the run-up characteristic by the variation of the load on the spring 47 as in Figure 1, or by variation of the orifice 72 as in Figure 2, will be determined according to the particular requirements of the engine to be governed.

Referring again to Figures 3A and 3B, the run-up characteristics, as illustrated in Figure 4A by way of example, are indicated by dotted lines showing the cut-off effected by the second hydraulic governor, these "cut-off" lines being reference $N_1$, $N_2$ referring respectively to the two selected speeds with run-up values $\Delta N$, $\Delta N'$ (or $\Delta N_1 \Delta N_2$ when the cut-off lines refer to the "run-up" in Figure 4B).

In operation, the engine rotational speed stabilizes at the intersection of the cut-off lines $N_1$, $N_2$ with the engine requirement lines $ER_0$ and $ER_{40}$. It will be observed that since the engine requirement lines $ER_0$ and $ER_{40}$ lie between the maximum and minimum flow lines $OA_0$ (max.), $OA_{40}$ (max.) and $OA_0$ (min.), $OA_{40}$ (min.), the extent to which excess fuel can be supplied to the engine during acceleration is limited by the quantity represented by the vertical distance between the engine requirement lines and maximum fuel flow lines, and the extent to which the fuel supply can be cut-down is represented by the vertical distance between the minimum fuel flow and engine requirement lines. In this manner excessive overfuelling and under fuelling is avoided, particularly at altitude where the operation of the capsule on the valve 42 causes the reduction of slope of flow lines $OA_{40}$ as compared with that of flow lines $OA_0$.

Referring now to Figure 5, there is illustrated a modification of the arrangement shown in Figure 2. In this arrangement the fixed restricting orifice 75 is replaced by a restricting orifice 175, the effective area of which can be varied in accordance with the ambient atmospheric temperature under control of a capsule 176 which is responsive to variations in the ambient atmospheric temperature. The purpose of this capsule is to modify the pressure drop across the restricted orifice 175 in accordance with the ambient temperature by increasing the effective area of the orifice with reduction of the temperature and vice versa. Thus, the pressure drop operating on the diaphragm 29 is increased thus increasing the fuel flow to the engine on reduction in the ambient temperature and decreasing the fuel flow on increase of the ambient temperature. In combination with the ambient-pressure-responsive capsule 58 the capsule 176 controls the fuel flow to the engine accurately in accordance with the density of the ambient atmospheric air or, where the capsules are responsive to the pressure and temperature in the intake to the engine in accordance with the density of the compressor intake air.

The arrangement shown in Figure 5 also differs from the arrangement shown in Figure 2, in that a by-pass 177 is provided around the variable orifice 72 and a spring-loaded relief valve 178 is provided in the by-pass to open when the pressure drop across the variable orifice 72 exceeds a predetermined value. In this way excessive cut-off of the fuel flow to the engine, for example on rapid deceleration, can be avoided.

It will be appreciated that the features of difference in the two systems illustrated respectively in Figures 1 and 2 may be varied in combination; for example as shown in Figure 6 the variable orifice control 272 instead of an adjustable loading control could be used in a system involving the use of a fixed volumetric governor pump 222 separate from the fuel pump 210, the remainder of the system being as shown in Figure 1. In certain cases in order to obtain the desired run-up characteristics the variable datum hydraulic governor may include both the feature of varying the loading on a spring and also varying the size of a metering orifice.

In addition the system may be used in combination with a temperature control system of known or convenient kind, the function of such temperature control system being to ensure that the temperature of gases flowing through the turbine system of the engine does not exceed a predetermined value. For example a temperature sensitive element such as a thermocouple or resistance thermometer situated in the exhaust duct of the engine may provide a voltage output when the predetermined value of the temperature is exceeded, which output is amplified through a suitable electronic amplifier to actuate a fuel control means reducing the supply of fuel to the engine. In applying such a system to the arrangement described with reference to Figures 1 and 2 the output of the amplifier could be used to open a fuel by-pass valve from the supply line 39; alternatively it could be used to apply a load to the capsule 58 in the sense of reducing the fuel supply, i. e. by simulating an increase of altitude; yet another alternative could be to modify the restricting orifice 25 or 72.

The system described in relation to Figures 1 and 2 are particularly suitable for use with gas-turbine engines for aircraft propulsion in which propulsive thrust is derived from the high exit velocity of an exhaust gas stream, the rotational speed of a compressor and turbine rotor assembly being determined by the fuel supply to the engine. The invention is also applicable to gas-turbine engines in which external shaft power is derived, and utilized for example in driving an airscrew or ducted fan. In such cases it is preferably arranged that the load imposed by the airscrew is adjusted by means of a temperature control system such as outlined above, to avoid excessive temperatures arising in the turbine.

We claim:

1. In a fuel metering device for an engine, a fuel conduit, a first valve in said fuel conduit, a first pressure-responsive element connected to said first valve, means for producing hydraulically a differential across said element which differential is a function of engine speed to load said element in the sense of opening said first valve, a second valve in series with said first valve, a second pressure-responsive element subjected to the differential across said second valve and connected to said first valve to load it in opposition to said first pressure-responsive element, a third pressure-responsive element connected to said second valve, means for producing hydraulically a pressure differential across said third element which differential is a function of engine speed to load said third element in the sense of closure of said second valve, resilient means to load said third element in opposition to the load imposed by said pressure differential across said third element, and speed-selecting means operative to vary at will the resultant load on said third element.

2. A fuel metering device according to claim 1 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

3. A fuel metering device according to claim 1 wherein one of said means for producing hydraulically a pressure differential which differential is a function of engine speed includes a variable-area orifice, and further comprises an atmospheric-temperature-responsive element connected to vary the area of said variable-area orifice.

4. A fuel metering device according to claim 3 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

5. In a fuel metering device for an engine, a fuel conduit, a first valve in said fuel conduit, a first pressure-responsive element connected to said first valve, means for producing hydraulically a differential across said element which differential is a function of engine speed to load said element in the sense of opening said valve, a second valve in series with said first valve, a second pressure-responsive element subjected to the pressure differential across said second valve and connected to said first valve to load it in opposition to said first pressure-responsive element, a third pressure-responsive element connected to said second valve, means for producing hydraulically a differential across said third element which differential is a function of engine speed, to load said third element in the sense of closure of said second valve, resilient means to load said third element in opposition to the load imposed by said pressure differential across said third element, and speed-selecting means comprising an adjustable abutment for said resilient means and means for adjusting said abutment at will.

6. A fuel metering device according to claim 5 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

7. A fuel metering device according to claim 5 wherein one of said means for producing hydraulically a pressure differential which is a function of engine speed includes a variable-area orifice, and further comprises an atmospheric-temperature-responsive element connected to vary the area of said variable-area orifice.

8. A fuel metering device according to claim 7 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

9. In a fuel metering device for an engine, a fuel conduit, a first valve in said fuel conduit, a first pressure-responsive element connected to said first valve, means for producing hydraulically a differential across said first element which differential is a function of engine speed to load said element in the sense of opening said first valve, a second valve in said conduit in series with said first valve, a second pressure-responsive element subjected to the pressure differential across said second valve, and connected to said first valve to load it in opposition to said first pressure-responsive element, a third pressure-responsive element connected to said second valve, means for producing hydraulically a pressure differential across said third element which differential is a function of engine speed comprising a fixed-volumetric-capacity pump connected to be driven at a speed proportional to the engine rotational speed, conduit means through which passes the whole delivery from said pump, variable-area orifice means in said conduit means, a pressure connection from said conduit means upstream of said orifice means to one side of said third element, a pressure connection from said conduit means downstream of said orifice means to the other side of said third element whereby said third element is loaded in the sense of closure of said second valve by the pressure drop across said orifice means, resilient means to load said third element in the sense of opening of said second valve, and speed-selecting means comprising means to vary at will the area of said variable-area orifice means.

10. A fuel metering device according to claim 9 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

11. A fuel metering device according to claim 9 wherein said means for producing hydraulically a pressure differential across said first element which differential is a function of engine speed includes a variable-area orifice, and further comprising an atmospheric-temperature-responsive element connected to vary the area of said variable-area orifice.

12. A fuel metering device according to claim 11 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

13. In a fuel metering device for an engine, a main fuel pump, a fixed-volumetric-capacity pump connected to be driven at a speed proportional to the rotational speed of the engine, a conduit into which the entire flow from said fixed-capacity pump is delivered, a restricting orifice in said conduit, a first valve through which passes the delivery from said main fuel pump, a first pressure-sensitive element subjected to the pressure differential across said restricting orifice and connected to said first valve to load it in the sense of opening on increase of said pressure differential, a second valve in series with said first valve, a second pressure-sensitive element subjected to the pressure differential across said second valve and connected to said first valve to load it in opposition to the load applied by said first pressure-sensitive element, a third pressure-sensitive element connected to said second valve, means for producing hydraulically a pressure differential across said third element which differential is a function of engine speed to load said element in the sense of closure of said second valve on increase of said load, resilient means connected to said third element to load it in opposition to the load imposed by said pressure differential, and speed selecting means to vary at will the resultant load on said third element.

14. A fuel metering device according to claim 13 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure and wherein said third pressure-responsive element is connected with said second valve to move it in the other of said senses.

15. A fuel metering device according to claim 13 wherein said restricting orifice is a variable area orifice, and further comprises an atmospheric-temperature-responsive element connected to vary the area of said variable-area orifice.

16. A fuel metering device according to claim 15 wherein said second valve comprises a cylindrical valve body arranged for movement in the axial sense and the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

17. In a fuel metering device for an engine, a main fuel pump, a fixed-volumetric-capacity pump connected to be driven at a speed proportional to the rotational speed of the engine, a conduit into which the entire flow from said fixed capacity pump is delivered, a restricting orifice in said conduit, a first valve through which passes the delivery from said main fuel pump, a first pressure-sensitive element subjected to the pressure differential across said restricting orifice and connected to said first valve to load it in the sense of opening on increase of said pressure differential, a second valve in series with said first valve, a second pressure-sensitive element subjected to the pressure differential across said second valve and connected to said first valve to load it in opposition to the load applied by said first pressure-sensitive element, a third pressure-sensitive element subjected to the pressure differential across said restricting orifice and connected to said second valve to vary the area thereof in the sense of decreasing said area on increase of said pressure differential, resilient means connected to said third element to load it in opposition to the load imposed by said pressure differential, and speed-selecting means comprising an adjustable abutment for said resilient means and means for adjusting said abutment at will.

18. A fuel metering device according to claim 17 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

19. A fuel metering device according to claim 17 wherein said restricting orifice is a variable area orifice, and further comprises an atmospheric-temperature-responsive element connected to vary the area of said variable-area orifice.

20. A fuel metering device according to claim 19 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

21. In a fuel metering device for an engine, a main fuel pump, a fixed-volumetric-capacity pump connected to be driven at a speed proportional to the rotational speed of the engine, a conduit into which the entire flow from said fixed-capacity pump is delivered, a first restricting orifice in said conduit, a variable-area restricting orifice in series therewith, a first valve through which passes the delivery from said main fuel pump, a first pressure-sensitive element subjected to the pressure differential across said first restricting orifice and connected to said first valve to load it in the sense of opening on increase of said pressure differential, a second valve in series with said first valve, a second pressure-sensitive element subjected to the pressure differential across said second valve and connected to said first valve to load it in opposition to the load applied by said first pressure sensitive element, a third pressure-sensitive element subjected to the pressure differential across said variable-area restricting orifice and connected to said second valve to vary the area thereof in the sense of decreasing said area on increase of said pressure differential, resilient means connected to said third element to load it in opposition to the load imposed by said pressure differential, and speed-selecting means comprising means to vary at will the area of said variable-area restricting orifice.

22. A fuel metering device according to claim 21 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

23. A fuel metering device according to claim 21 wherein said first restricting orifice is a variable area orifice and further comprises an atmospheric-temperature-responsive element connected to vary the area of said first restricting orifice.

24. A fuel metering device according to claim 23 where said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

25. In a fuel-metering device for an engine, a fixed-volumetric-capacity fuel pump, driving means to drive said fixed capacity pump at a speed proportional to the rotational speed of the engine, a conduit into which the entire flow from said fixed-capacity pump is delivered, a restricting office in said conduit, a relief valve downstream of said restricting orifice through which passes the surplus fuel delivered by said pump which is not delivered to the engine, a first valve through which passes the entire fuel delivery to the engine from said pump, a first pressure-sensitive element subjected to the pressure differential across said restricting orifice and connected to the first valve to load it in the sense of opening on increase of said pressure differential, a second valve in series with said first valve, a second pressure-sensitive element subjected to the pressure differential across said second valve and connected to said first valve to load it in opposition to the load applied by said first pressure-sensitive element, a third pressure-sensitive element connected to said second valve, means for producing hydraulically a pressure differential across said third element which differential is a function of engine speed to load said element in the sense of closure of said second valve on increase of said differential, resilient means connected to said third element to load it in opposition to the load imposed by said pressure differential, and speed-selecting means to vary at will the resultant load on said third element.

26. A fuel metering device according to claim 25 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

27. A fuel metering device according to claim 25 wherein said restricting orifice is a variable area orifice and further comprises an atmospheric-temperature-responsive element connected to vary the area of said first restricting orifice.

28. A fuel metering device according to claim 27 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

29. In a fuel metering device for an engine, a fixed-volumetric capacity fuel pump connected to be driven at a speed proportional to the rotational speed of the engine, a conduit into which the entire flow from said fixed-capacity pump is delivered, a first restricting orifice in said conduit, a variable-area restricting orifice in series with said first orifice, a relief valve downstream of said restricting orifices through which passes the surplus fuel delivered by said pump which is not delivered to the engine, a first valve through which passes the entire fuel delivery to the engine, a first pressure-sensitive element subjected to the pressure differential across said first restricting orifice and connected to the first valve to load it in the sense of opening on increase of said pressure differential, a second valve in series with said first valve, a second pressure-sensitive element subjected to the pressure differential across said second valve and connected to said first valve to load it in opposition to the load applied by said first pressure-sensitive element, a third pressure-sensitive element subjected to the pressure differential across said variable-area restricting orifice and connected to the second valve to vary the effective area of the opening thereof in the sense of decreasing said effective area of the opening on increase of said pressure differential, resilient means connected to said third element to load it in opposition to the load due to the pressure differential and speed-selecting means comprising means to vary at will the area of said variable-area restricting orifice.

30. A fuel metering device according to claim 29 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

31. A fuel metering device according to claim 29 wherein said first restricting orifice is also a variable area orifice and further comprises an atmospheric - temperature - responsive element connected to vary the area of said first restricting orifice.

32. A fuel metering device according to claim 31 wherein said second valve comprises a cylindrical valve body arranged for movement in the axial sense and in the rotational sense, further comprising a pressure-responsive element arranged to be responsive to atmospheric pressure, and a connection between said atmospheric pressure-responsive element and said second valve arranged to cause said second valve to move in one of said senses to open it on increase of atmospheric pressure and to close it on decrease of atmospheric pressure, and wherein said third pressure-responsive element is connected with said second valve to move it in the other of said senses.

References Cited in the file of this patent

UNITED STATES PATENTS

| Number | Name | Date |
| --- | --- | --- |
| 2,223,381 | Mock | Dec. 3, 1940 |
| 2,374,844 | Stokes | May 1, 1945 |
| 2,407,115 | Udale | Sept. 3, 1946 |
| 2,422,808 | Stokes | June 24, 1947 |
| 2,440,566 | Armstrong | Apr. 27, 1948 |
| 2,440,567 | Armstrong et al. | Apr. 27, 1948 |
| 2,479,813 | Chamberlin et al. | Aug. 23, 1949 |
| 2,581,275 | Mock | Jan. 1, 1952 |
| 2,581,276 | Mock | Jan. 1, 1952 |

FOREIGN PATENTS

| Number | Country | Date |
| --- | --- | --- |
| 604,466 | Great Britain | July 5, 1948 |
| 634,095 | Great Britain | Mar. 15, 1950 |